INVENTOR.
John F. Byrne

March 9, 1965 J. F. BYRNE 3,173,137
RADIO WARNING SYSTEM
Filed April 18, 1960 3 Sheets-Sheet 2
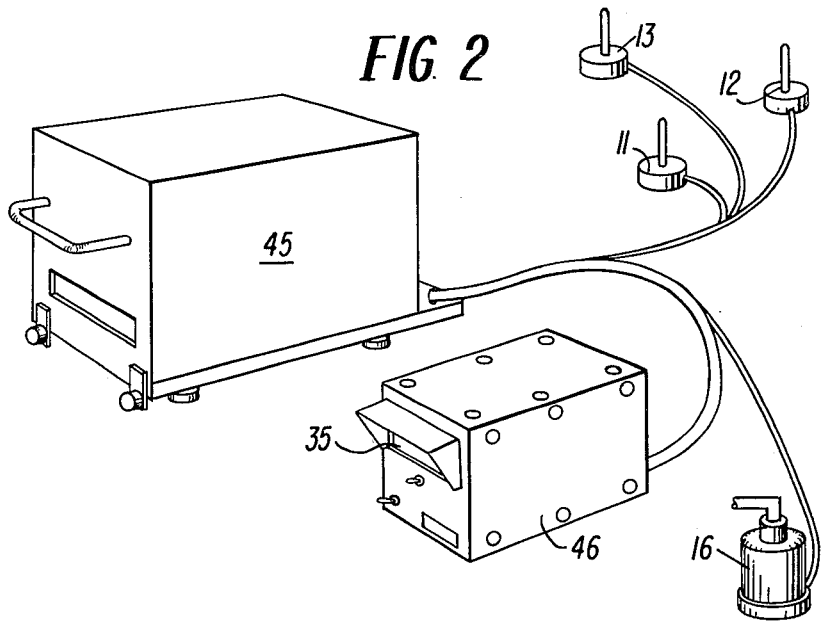
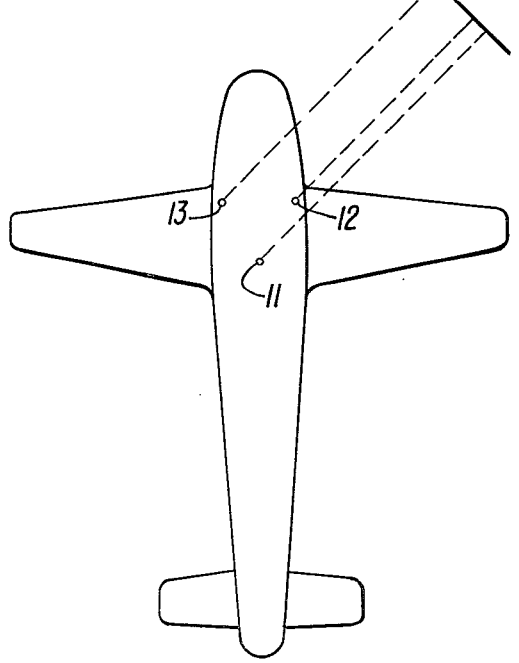
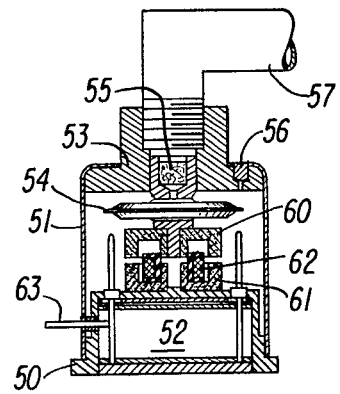
INVENTOR.
John F. Byrne
BY Mueller & Aichele
Attys.

March 9, 1965   J. F. BYRNE   3,173,137
RADIO WARNING SYSTEM
Filed April 18, 1960   3 Sheets-Sheet 3
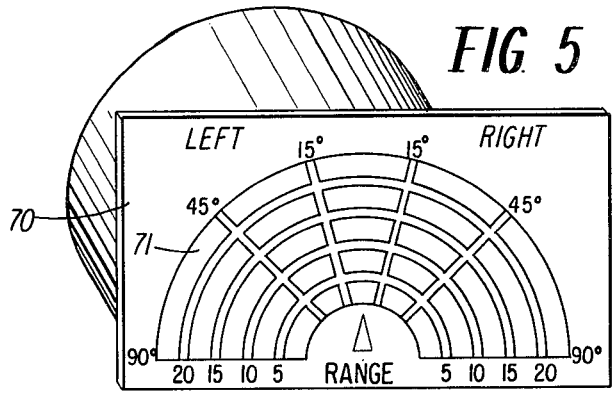
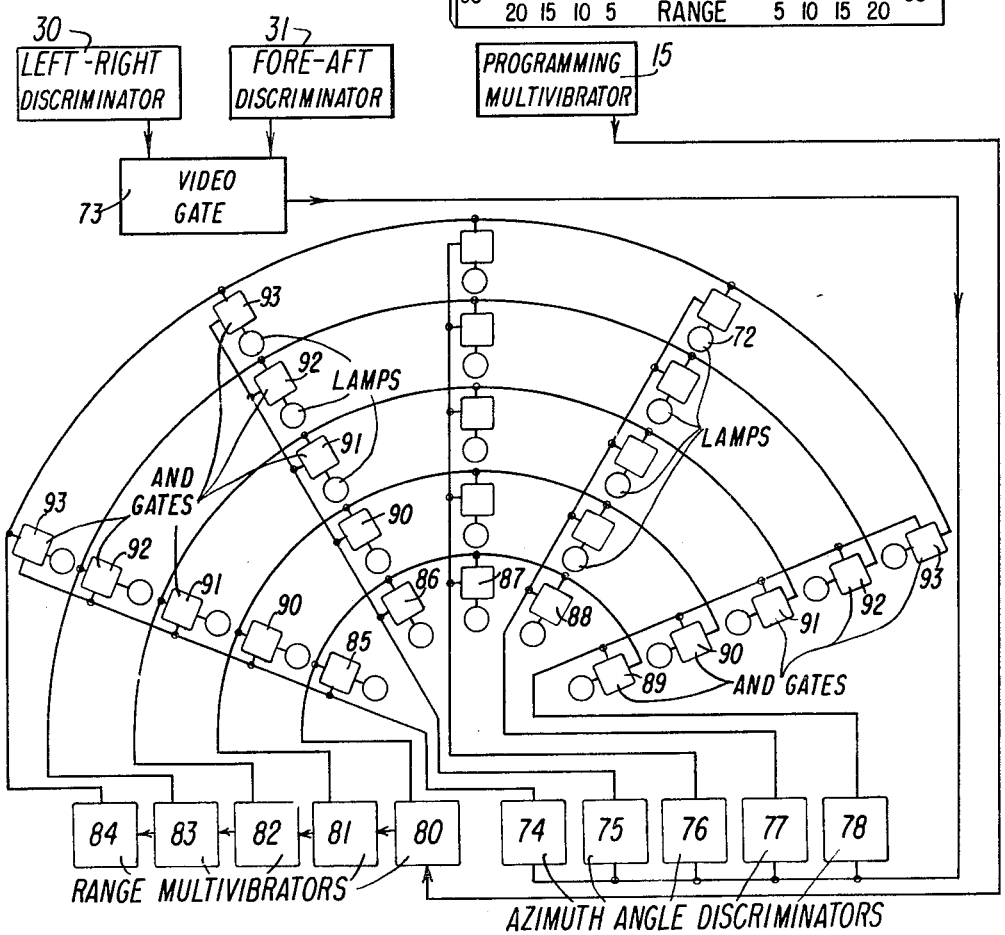
INVENTOR.
John F. Byrne
BY Mueller & Aichele
Attys.

United States Patent Office 3,173,137
Patented Mar. 9, 1965

3,173,137
RADIO WARNING SYSTEM
John F. Byrne, Riverside, Calif., assignor to Motorola, Inc., Chicago, Ill., a corporation of Illinois
Filed Apr. 18, 1960, Ser. No. 22,824
11 Claims. (Cl. 343—6.5)

This invention relates generally to approach warning systems and more particularly to a system for use in aircraft to warn the operator of the proximity of other aircraft in the same altitude region.

Because air-to-air collisions almost certainly result in fatalities, and as the number of such collisions have increased with the increasing use of aircraft, equipment for warning the operator of aircraft of the proximity of other aircraft is highly important. Although it would be desirable to have warning equipment which is entirely self-contained and does not depend upon other aircraft to provide a warning, the extensive efforts made in this direction have not provided a satisfactory system. Since a warning system is needed on all aircraft, equipment which requires cooperation between aircraft would be acceptable if such equipment is sufficiently simple that the cost is within the range of owners of all types of aircraft. Further, such a system must be flexible so that simple equipment providing minimum facilities can be used on small aircraft and more complex equipment with additional features can be provided when desired, with all the systems cooperating with each other to provide the basic warning facilities.

It is therefore an object of the present invention to provide a simple, cooperative proximity warning system.

A further object of the invention is to provide a cooperative warning system for aircraft which will provide an alarm for the operator of the aircraft when another aircraft is in the same altitude region.

Another object of the invention is to provide an aircraft warning system which produces an alarm when another aircraft is within a given range in the forward direction and/or which accurately indicates the position of such other aircraft.

A feature of this invention is the provision of a cooperative warning system for aircraft wherein each aircraft has equipment which transmits a code signal which indicates its altitude, and receives signals from other aircraft and compares the altitude of such other craft as indicated by the code signals therefrom, and operates an alarm when other craft are within the same altitude region.

A further feature of the invention is the provision of a cooperative warning system wherein a first aircraft sends out an interrogation wave frequency modulated by a code signal which indicates its altitude, and other aircraft receiving the wave and which are flying in the same altitude region send a reply wave at the termination of the interrogation wave. The reply wave may be received by the first aircraft and the time delay of the reply wave indicates the range of the aircraft which have replied, and the direction of the reply wave indicates the direction of such craft. The range and direction may be displayed on a scope so that the operator can easily observe the position of other aircraft within the same altitude region.

Another feature of the invention is the provision of a warning system including a pressure responsive reactance element the characteristics of which vary with its altitude to control the frequency of an oscillator and thereby provide a code signal indicating the altitude which may be transmitted to other aircraft. A similar reactance device may be used to compare the code signal received from other craft and automatically provide a warning signal when other aircraft are flying at the same altitude as the receiving aircraft.

Still another feature of the invention is the provision of a warning system including a display device which indicates the position of other craft within the same altitude range, with the indicator having segments selectively illuminated to show the regions occupied by the other craft.

The invention is illustrated in the drawings wherein:

FIG. 2 shows the equipment required in the system;

FIG. 3 illustrates the structure of the altimeter assembly;

FIG. 4 illustrates the mounting of the receiving antennas on the airplane;

FIG. 5 illustrates an alternate display unit; and

FIG. 6 is a block diagram illustrating the display unit of FIG. 5.

Figure 1:
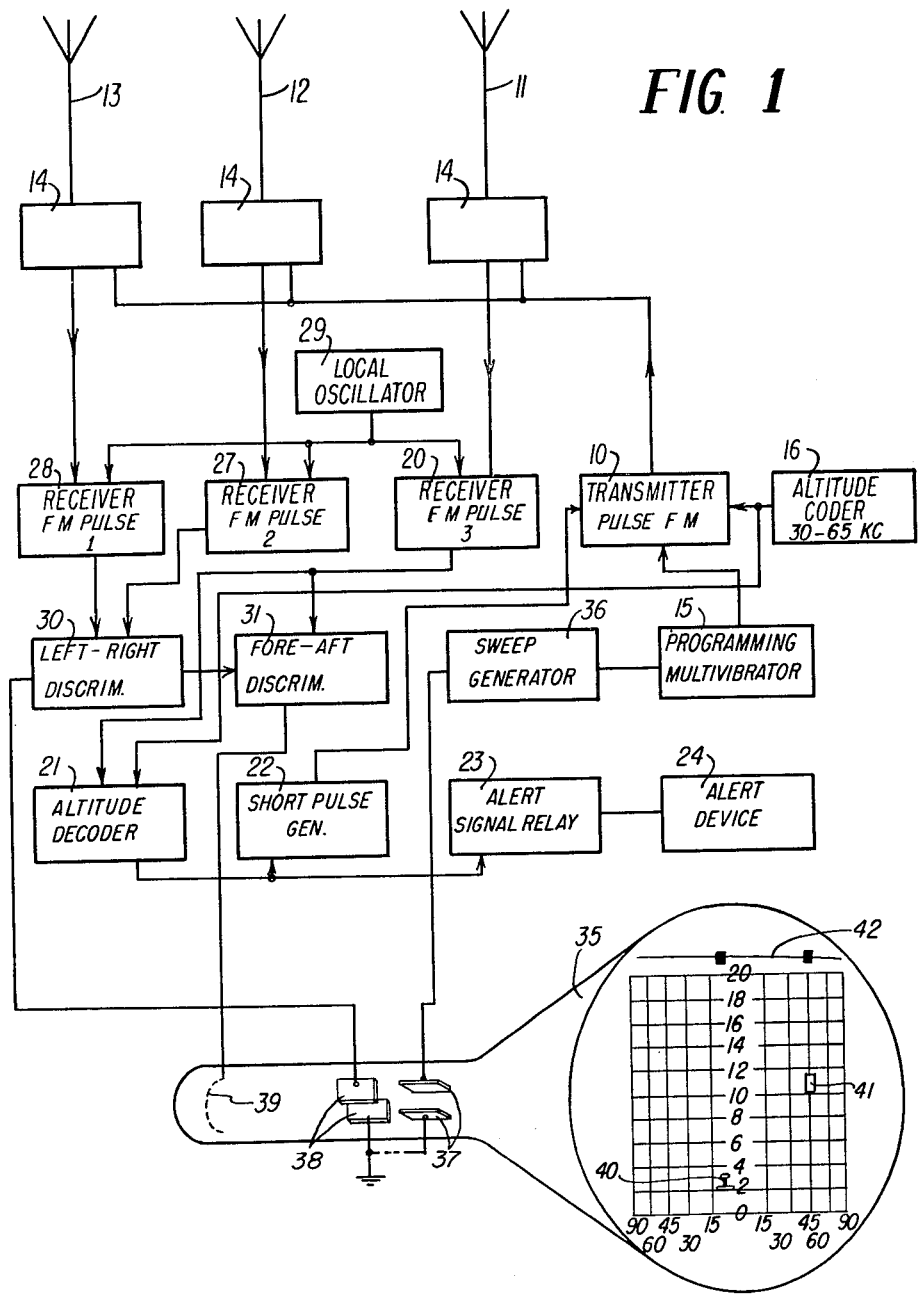
FIG. 1 is a block diagram of the system and shows the display which may be provided.

In practicing the invention, apparatus is provided for installation on aircraft including a transmitter which produces a carrier wave which may be frequency modulated by a code signal and a receiver for receiving the waves from other aircraft. An altimeter device or coder is provided for producing the code signal which may be an inductance having a core moved by a pressure responsive capsule to vary the inductance with the altitude, with the inductor being connected in an oscillator circuit to provide different frequencies at different altitudes. The receiver includes a decoder having a second altimeter device (or is coupled to the coder) to produce an alarm signal when the code signal received indicates that another aircraft is in the same altitude region. The alarm signal in addition to operating alarm means in the aircraft also actuates the transmitter to send a reply wave. The receiving equipment may include three antennas and three receiver sections, and circuit and display means for indicating the position of aircraft from which reply waves are received. The reply wave is transmitted immediately at the close of the interrogation wave so that the range of the other aircraft can be determined by the time delay of the reply wave. Various displays may be provided to indicate the position of other aircraft such as a "B-scope" display which directly shows the relative position of other aircraft, or a simple illuminated display having sections selectively illuminated to indicate regions occupied by other craft.

Referring now to the drawings, in FIG. 1 there is illustrated in block diagram form the basic system of the invention. The transmitter 10 is connected to antenna 11, and may operate at any desired frequency such as in the very high frequency range from 125 to 250 megacycles. A programming unit 15 is coupled to the transmitter 10 to cause the transmitter to send out intermittent interrogation wave pulses. These pulses may have a duration of 500 microseconds, and a repetition rate of 20 per second. The interrogation pulses are frequency modulated by a code signal provided by the altimeter device or altitude coder 16. It has been found that code signals in the frequency range from 30 to 65 kilocycles are suitable and the coder automatically produces a code frequency in accordance with the altitude of the aircraft in which it is installed.

The equipment in its most simple form may include a single receiver 20 connected to antenna 11 which receives interrogation pulses from other aircraft. The modulation is derived from the received wave and applied to altitude decoder 21 which produces an alarm signal when the received code signal represents an altitude within a predetermined range of the altitude of the aircraft receiving the signal. Signals from the altitude coder 16 may be applied to the decoder 21 and compared with the received signals to provide warning signals. Alternatively the decoder 21 may include an altitude responsive device so that connection to the coder 16 is not required.

The warning signal from decoder 21 is applied to short pulse generator 22 which causes operation of the transmitter 10 to transmit a reply pulse which is of short duration as for example 15 microseconds. The warning signal from the decoder 21 is also applied to alert signal relay 23 which operates an alert device 24 to warn the operator that other aircraft are in the same altitude range. The alert signal device may provide an audible or visible signal, or both, to attract the attention of the operator of the aircraft.

The equipment which has been described is sufficient for giving a warning to operators of aircraft of the proximity of other aircraft in the same altitude range. It is apparent that this may be a very simple system and will be entirely automatic. The basic system may be expanded upon to provide a more complete indication as will be further explained. The 500 microsecond interrogation pulses are spaced by time intervals having a duration one hundred times the length of the pulses to permit the reception of interrogation pulses from other aircraft. The receipt of an interrogation pulse is all that is necessary to operate the alert device, if the code of the interrogation pulse indicates that an aircraft is in the same altitude range as the aircraft which receives the interrogation pulse.

As indicated in FIG. 1 the system may be more complex than that described above with the additional equipment giving an indication of the position of other aircraft in the same altitude range. In such case three antennas 11, 12 and 13 are provided to which are coupled three receivers 20, 27 and 28. The transmitter 10 may be connected to all three antennas with transmit-receive units 14 separating transmitted and received signals. Receivers 20, 27 and 28 are each FM receivers with limiting for producing output signals with identical phase relationship with the input signals. To produce a common reference for the individual ones of the receivers a single local oscillator 29 is provided for the three receivers so that the phase of the output waves of the receivers are synchronized. The output signal of each receiver is therefore related in phase to the phase difference presented to an incoming signal by virtue of the spatial location of each of antennas 11, 12 and 13. The antennas 12 and 13 are positioned on a line perpendicular to the longitudinal axis of the plane (FIG. 4) and are designated "right" and "left" respectively. These are spaced something less than a quarter wave length apart, and for the frequency range referred to above may be spaced about two feet apart. The antenna 11 may be mounted either fore or aft of the other two, and is designated "aft" in FIG. 1 and shown this way in FIG. 4.

The outputs of the receivers 27 and 28, which are coupled to the right and left antennas, are applied to the left-right discriminator 30. This produces an output which indicates the relative position of the source of received waves to the right or left. The average signal from the receivers 27 and 28, together with the output from receiver 20, are applied to the fore-aft discriminator 31. This provides an output indicating the position of the source of the received waves with respect to the direction of movement of the aircraft.

For displaying the position of the other aircraft in the same altitude range as the aircraft in which the equipment is installed, there is provided an indicator 35. This may provide a B-scope display and is illustrated as a cathode ray tube having a screen on which a scale is provided. Connected to the programming multivibrator 15 is a sweep generator 36 which applies signals to deflection plates 37 which control the vertical position of the beam. This generator is arranged to start the vertical sweep at the end of the interrogation pulse. The sweep starts from the bottom of the screen and moves upward to the top of the screen during a time period which will include the output time required for reply pulses transmitted from other aircraft in the range of interest to be received in the aircraft carrying the equipment. It has been proposed to display aircraft within a range of 25 miles and a period of 270 microseconds is therefore required for the beam to sweep from the bottom line of the scale to the top line.

The left-right discriminator 30 is coupled to deflection plates 38 which control the horizontal deflection of the beam. The signal of left-right discriminator 30 applied to the horizontal deflection plates causes the beam, as it scans upwardly, to be deflected to the right or left as radio frequency signals are received from other aircraft indicating that such aircraft are present to the right or left. The fore-aft discriminator 31 provides a voltage which is applied to the grid 39 of the display tube for controlling the beam intensity. The beam intensity is normally held at a level so that the screen is not illuminated. However, when the fore-aft discriminator indicates the presence of a plane in the forward direction the voltage on grid 39 will be increased to cause intensification of the beam and this will produce an indication on the screen. The left-right discriminator will produce a voltage to deflect the beam when other aircraft are within the same altitude region, regardless of whether the other aircraft is in front of, or trailing, the aircraft involved. The fore-aft discriminator may cause the beam intensity to be increased only when signals are received from an aircraft which is in front of the plane, so that only these aircraft will be shown on the screen.

The indications shown at 40 and 41 on the indicator 35 are representative of planes which are displayed. The indication 40 represents a plane at a distance of two miles and at an angle of approximately 10° to the left. The indication 41 represents a plane at a distance of 10 miles and at an angle of approximately 45° to the right. At the end of the vertical scanning period the beam will be held at a vertical position directly above the scale as indicated at 42. This will produce bright spots in the trace when reply signals from other planes in front of the plane are received to indicate the presence of such other planes, and their position will be more particularly shown if the distance is reduced.

FIG. 2 shows the physical form the equipment may take. The main unit 45 includes the transmitter and receivers, the programming multivibrator, the discriminators, the altitude decoder and the short pulse generator. The altitude coder 16 is provided as a separate element, and this is shown more fully in FIG. 3. The antennas 11, 12 and 13 are arranged to be mounted either on the bottom or top of the aircraft in a vertical plane. The positioning is shown in FIG. 4. The transmitter-receiver unit may be stowed in a storage compartment on the plane, but the compact display unit 46, if provided in the system, must be placed so that the pilot may view the same. As previously stated only an audible or visual signal indicating the presence of another aircraft may be provided to alert the pilot in a simple system, and the display unit may be provided to give an indication of the relative position. the display unit 46 includes the display tube 35 with sweep and power supplies therefor, and may also include controls for the system.

In FIG. 3 there is illustrated the structure of the altitude coder. This includes a base 50 to which a cup-shaped housing 51 is mounted. A cavity 52 is provided in the base which may house components forming an oscillator. A top assembly 53 supports a pressure responsive aneroid capsule 54. A coupling 57 is provided to a static air line in the plane and a filter 55 is provided for the air entering the bellows. The top assembly 53 includes a sealed opening 56 which is used to provide the desired pressure about the capsule. The capsule 54 therefore responds to the pressure at the altitude at which the aircraft is flying.

The capsule operates to change the inductance of a reactance unit coupled thereto. The inductance unit includes coil 62 and core sections 60 and 61 which provide a flux path thereabout. The coil 62 and core section 61 are mounted on the base structure 50 and the core section 60 is supported by the capsule 54. Movement of the core 60 changes the reluctance of the flux path about the coil to thereby change the effective inductance of the coil. The coil 62 may be conneced in an oscillator circuit to change the frequency of oscillations as the pressure changes at different altitudes. Signals from the oscillator circuit may be applied to the transmitter unit through cable 63. As previously stated the oscillator may provide an output frequency of 30 to 65 kilocycles, with the frequency being lowest at lower altitudes and increasing as the altitude increases. The change of frequency with altitude may be nonlinear to provide the desired frequency increments at various altitudes so that the indications can be of the desired accuracy.

It is believed that the basic operation of the system will be apparent from the foregoing description of the equipment. The programming multivibrator controls the transmission of interrogation pulses so that relatively long pulses are applied which are modulated by the signal produced by the altitude coder. These are transmitted by one or more of the antennas. The interrogation signals are received by aircraft within communication range and applied to the altitude decoder thereof which produces a warning signal when the interrogation signal indicates that other planes are in the same altitude region. At the end of the interrogation signal the aircraft receiving the signal provides a reply pulse which is a pulse of relatively short duration which is not coded.

Aircraft having the full equipment for indicating the position of other aircraft will receive reply pulses and as the sweep of the display is initiated at the time transmission of an interrogation pulse is terminated, the time delay in receiving the reply pulse will indicate the range of the replying aircraft. The reply wave is also used to determine the direction of the aircraft sending the same. Referring to FIG. 4, and assuming that the reply waves come from the direction shown by the line 65, the received signal will be received at antenna 12 before it is received at antenna 13. The signals from the two antennas will be individually applied to the receivers coupled thereto and since they have a common local oscillator the output signals will have the same phase relation as the received signals. Therefore the left-right discriminator 30 can compare the phases of the received waves and produce an output representing the relative right-left position of the source. Signals from antennas 12 and 13, combined vectorially by left-right discriminator 30, produce an average signal having the same phase with respect to signals from antenna 11 as would a signal produced by an antenna located midway between antennas 12 and 13. The complex value of this average signal is indicative of the azimuth of the source producing the signals received by antennas 12 and 13. However, a mirror image of this signal source will produce a like average signal and a two antenna system will not distinguish between signals originating in front of and signals originating behind the aircraft. To resolve this ambiguity another average is taken by fore-aft discriminator 31, which functions in the same manner as left-right discriminator 30. The average of the signals received by antennas 12 and 13 together with the signal received by antenna 11 is therefore utilized to establish the position of the source with respect to the direction of movement. In the example of FIG. 4, the average signal will be ahead of the signal from antenna 11. The fore-aft discriminator 31 will produce an output representing this relative fore-aft position. By controlling the movement of the beam of the display unit by the time interval and the right-left output, and the intensification of the beam by the fore-aft output, bright spots are provided on the screen to indicate the position of the replying aircraft.

In FIG. 5 there is shown a display device for use in the system which may be used instead of the indicator 35 of FIG. 1. This display unit 70 includes a front face or indicating panel having a plurality of arcuate sections 71 which may be individually illuminated. These are arranged in five angular spaced sectors which represent azimuth, and in five radially spaced rows which represent distance. There is a center sector representing angles extending 15° on either side of a center line, with adjacent sectors on either side extending from 15° to 45°, and then outer sectors extending from 45° to 90°. The central sectors, where the interest is greatest, have smaller angular extensions than the outer sectors. The radially displaced rows may represent a distance span of 5 miles showing respectively maximum distances of 5, 10, 15, 20, and 25 miles. It should be noted that the azimuth representation is restricted to the forward 180° sector of the aircraft for it is unnecessary in the system to provide information concerning the rear 180° sector.

Each section 71 of the device of FIG. 5 is illuminated by a lamp 72, and these lamps and the energizing circuit therefor is shown in FIG. 6. The lamp energizing circuits are activated by left-right discriminator 30 under the control of fore-aft discriminator 31. To this end fore-aft discriminator 31 controls video gate 73 and enables this gate only when a signal originating in the forward 180° sector of the aircraft is received. On receipt of such signals the video gate is opened and left-right position information from left-right discriminator 30 is applied to azimuth angle discriminators 74, 75, 76, 77 and 78. Thus video gate 73 applies a signal to azimuth discriminators 74 to 78 when the receivers provide signals indicating an aircraft at the same altitude, and within a given distance in forward proximity to the aircraft in which the indicator is mounted. When video gate 73 has been opened by fore-aft discriminator 31, left-right discriminator 30 supplies azimuth position of the signal source to azimuth angle discriminators 74–78, which are polarity and magnitude gates that activate one input to the and-gates controlling individual lamps 72 in the azimuth sectors as hereinafter described.

In the system illustrated, azimuth angle discriminator 76 will provide an output voltage when the gated azimuth signal represents an aircraft within the sector extending 15° on either side of the center line. The timing signal from programming multivibrator 15 is applied to range multivibrator 80 which is the first of a series of one-shot multivibrators including multivibrators 81, 82, 83, and 84. These multivibrators are arranged to produce output voltages at time intervals corresponding to ranges extending to 5, 10, 15, 20, and 25 miles. The azimuth information supplied from left-right discriminator 30 to the azimuth angle discriminators activates only one of the two inputs of the and-gates 85–93 associated with individual lamps 72. The second input is derived from range multivibrators 80, 81, 82, 83 and 84. As previously mentioned, these multivibrators are time measuring devices, and they are set in operation by programming multivibrator 15 in such a manner that when the programming multivibrator indicates the end of modulated transmission of an interrogating signal, multivibrator 80 begins to time and does so for a period corresponding to the round trip time required for radio waves to travel a one-way distance of five miles. As shown in FIG. 6 the lamps behind the sections of the first radial row are coupled through and-gates 85, 86, 87, 88, and 89 to the output line from multivibrator 80, and to the output lines from azimuth angle discriminators 74, 75, 76, 77, and 78 respectively. Therefore during the time interval that the multivibrator 80 provides an output signal, if the video gate produces a signal causing one of the azimuth angle discriminators to conduct, the lamp associated with this discriminator will be energized to illuminate the section of the display which corresponds to the position of the aircraft producing the azimuth signal. The one-shot multivibrator 80 will be energized only for the period during which a signal will be received from another aircraft within the five mile range. At the end of this period the next multivibrator 81 will produce an output voltage to the and-gates 90 of the next radially spaced row of sections which represent a distance from 5 to 10 miles. The lamps of this row in the various sectors will be illuminated in accordance with signals from the video gate through action of the azimuth angle discriminator in the same manner as previously described in connection with the lamps of the first radial row. Similarly, the multivibrator 82 will apply output signals to the and-gates 91, the multivibrator 83 will provide output signals to the and-gates 92, and the multivibrator 84 will provide output signals to the and-gates 93 at succeeding time intervals during which signals would be received at distances from 10 to 15, 15 to 20, and 20 to 25 miles.

It is therefore obvious that the sections 71 of the display unit 70 will show the position of aircraft which are in front of and to the sides of the aircraft in which the indicator is mounted. The video gate can exclude signals back of the aircraft so that they will not be displayed.

The proximity warning system disclosed can be provided in extremely simple form so that the cost may be within the range of any aircraft. For complete warning as to all aircraft, all aircraft must have similar equipment, either in simple, or in more elaborate form. However, the presence of any aircraft will be indicated if minimally equipped. Inasmuch as the greatest danger of collisions is at high altitudes, at which small aircraft do not fly, great protection would be provided by use of the system only on aircraft flying at high altitudes. The system makes it possible to provide compatible equipment which may be very simple or which may be more elaborate to provide a precise indication of the position of other aircraft.

I claim:

1. Apparatus for use in aircraft including in combination, a transmitter for transmitting a carrier wave, said transmitter including means for frequency modulating the carrier wave, coder means for producing a code signal having a frequency related to the altitude of the aircraft, control means for applying said code signal to said modulating means and for causing intermittent operation of said transmitter to periodically transmit a carrier wave frequency modulated by said code signal, receiver means for receiving a carrier wave frequency modulated by a code signal related to the altitude of other aircraft and for deriving the frequency modulation code signal therefrom, decoder means for producing an output signal in response to a received code signal having a frequency within a predetermined range including the frequency of said code signal produced by said coder means, means connecting said decoder means to said transmitter responsive to said output signal to cause said transmitter to transmit a reply signal between periods of coded frequency modulated transmission, and alarm means in the aircraft coupled to said decoder means and responsive to said output signal.

2. Warning apparatus for use in aircraft including in combination, a transmitter for transmitting a carrier wave, said transmitter including means for frequency modulating the carrier wave, coder means for producing a code signal having a frequency related to the position of the aircraft, control means for applying said code signal to said modulating means and for causing intermittent operation of said transmitter to periodically transmit an interrogation pulse including a carrier wave frequency modulated by said code signal, receiver means for receiving a carrier wave frequency modulated by a code signal related to the altitude of other aircraft and for deriving frequency modulation signals therefrom, decoder means for producing an output signal in response to a received code signal having a frequency within a predetermined range including the frequency of said code signal produced by said coder means, means coupled between said decoder means and said transmitter to cause said transmitter to transmit a reply signal between periods of coded frequency modulated transmission in response to said output signal, and alarm means in the aircraft coupled to said decoder means and responsive to said output signal.

3. Apparatus for use in one aircraft for warning of the proximity of other aircraft in the same altitude region including in combination, a transmitter for transmitting a carrier wave, said transmitter including means for frequency modulating the carrier wave, coder means for producing a code signal having a frequency related to the altitude of the one aircraft, control means for applying said code signal to said modulating means and for causing operation of said transmitter to transmit a carrier wave frequency modulated by said code signal, receiver means including three spaced antennas and three receiving sections individually connected thereto, one of said receiving sections including means for deriving frequency modulation from received waves, decoder means coupled to said one receiving section for producing a warning signal in response to a received code signal having a frequency indicating another aircraft in the altitude region of the one aircraft, alarm means in the aircraft coupled to said decoder means and responsive to said warning signal, means coupling said decoder means to said transmitter for applying a keying signal thereto to cause operation of said transmitter to transmit a reply wave, and direction and range determining means coupled to said three receiver sections and responsive to a reply wave from another aircraft which is transmitted after receipt of a modulated wave from the one aircraft.

4. Apparatus for use in one aircraft for warning of the proximity of other aircraft in the same altitude region including in combination, coder means for producing a code signal having a frequency related to the altitude of the one aircraft, transmitting means, control means coupled to said coder means and to said transmitting means to cause operation of said transmitting means to transmit an interrogation wave including said code signal, receiver means including a plurality of spaced antennas and receiving sections individually connected thereto, one of said receiving sections including means for deriving the received code signals, decoder means coupled to said one receiving section for producing a warning signal in response to a received code signal having a frequency indicating other aircraft in the altitude region of said one aircraft, alarm means in the aircraft coupled to said decoder means and responsive to said warning signal, means coupling said decoder means to said transmitting means for applying a keying signal thereto to cause operation of said transmitter to transmit a reply wave, and direction and range determining means coupled to said receiver sections and responsive to reply waves from other aircraft transmitted in response to warning signals.

5. Apparatus for use in one aircraft for warning of the proximity of other aircraft in the same altitude region including in combination, coder means for producing a code signal having a frequency related to the altitude of the one aircraft, transmitting means, control means coupled to said coder means and to said transmitting means to cause operation of said transmitting means to transmit an interrogation wave including said code signal, receiver means including a plurality of spaced antennas and receiving sections individually connected thereto, one of said receiving sections including means for deriving the received code signals, decoder means coupled to said one receiving section for producing a warning signal in response to a received code signal having a frequency indicating other aircraft in the altitude region of said one aircraft, alarm means in the aircraft coupled to said decoder means and responsive to said warning signal, means coupling said decoder means to said transmitting means for applying a keying pulse thereto to cause operation of said transmitter to transmit a reply wave, and direction and range determining means coupled to said receiver sections and responsive to reply waves from other aircraft transmitted in response to warning signals, said last named means including display means for indicating the position of such other aircraft.

6. Apparatus for use in one aircraft for warning of the proximity of other aircraft in the same altitude region including in combination, a transmitter for transmitting a carrier wave, coder means for producing a code signal having a frequency related to the altitude of the aircraft, control means for applying said code signal to said transmitter and for causing operation of said transmitter to transmit an interrogation pulse including said code signal, receiver means including first, second and third antennas, said first and second antennas being spaced transversely across the aircraft, said third antenna being spaced longitudinally of the aircraft with respect to said first and second antennas, first, second and third receiving sections connected to said first, second and third antennas respectively, one of said receiving sections including means for deriving frequency modulation from received waves, decoder means coupled to said one receiving section for producing a warning signal in response to a received code signal having a frequency indicating another aircraft in the same altitude region as the one aircraft, alarm means in the one aircraft coupled to said decoder means and responsive to said warning signal, means coupling said decoder means to said transmitter to cause operation of said transmitter to transmit a reply wave pulse at the termination of a received interrogation pulse, display means including a cathode ray tube having a screen which is impinged by a beam and means for controlling the intensity of the beam and for deflecting the same, sweep means controlled by said control means for causing said beam to scan the screen vertically from the lower edge at the termination of said interrogation wave, means coupled to said first and second receiving sections providing a signal representing the direction of reply waves with respect to the longitudinal direction of the one aircraft and causing corresponding deflection of said beam horizontally across said screen, and means coupled to said first, second and third receiving sections and responsive to the phase of a signal received by said third section as compared to the average phase of the signal received by said first and second sections for increasing the intensity of said beam when a reply wave is received so that a bright spot is produced on the screen with the position of the spot vertically indicating the range of the aircraft sending the reply and the position horizontally and vertically indicating its direction.

7. Apparatus for use in one aircraft for warning of the proximity of other aircraft in the same altitude region including in combination, a transmitter for transmitting a carrier wave, said transmitter including means for frequency modulating the carrier wave, coder means for producing a code signal having a frequency related to the altitude of the aircraft, control means for applying said code signal to said modulating means and for causing operation of said transmitter to transmit an interrogation pulse including a carrier wave frequency modulated by said code signal, receiver means including first, second and third antennas, said first and second antennas being spaced transversely across the aircraft, said third antenna being spaced longitudinally of the aircraft with respect to said first and second antennas, first, second and third receiving sections connected to said first, second and third antennas respectively, one of said receiving sections including means for deriving frequency modulation from received waves, decoder means coupled to said one receiving section for producing a warning signal in response to a received code signal having a frequency indicating another aircraft in the same altitude region of the one aircraft, alarm means in the aircraft coupled to said decoder means and responsive to said warning signal, means coupling said decoder means to said transmitter to cause operation of said transmitter to transmit a reply pulse at the termination of a received interrogation pulse, display means including a cathode ray tube having a beam which impinges a screen and means for controlling the intensity of the beam and for deflecting the same, sweep means controlled by said control means for causing said beam to scan the screen in one direction at the termination of said interrogation wave, means coupled to said first and second receiving sections providing a signal representing the direction of reply waves with respect to the longitudinal direction of the one aircraft and causing corresponding deflection of said beam in a direction perpendicular to said one direction, and means coupled to said first, second and third receiving sections and responsive to the phase of the signal received by said third section as compared to the average phase of signals received by said first and second sections for increasing the beam intensity when a reply wave is received to produce a bright spot on the screen which indicates the range and direction of the aircraft sending the reply wave.

8. Apparatus for use in one aircraft for warning of the proximity of other aircraft in the same altitude region including in combination, coder means for producing a code signal having a frequency related to the altitude of the aircraft, said coder means including a coil and a core having a movable portion to control the effective inductance of said coil, pressure responsive means coupled to said movable core portion and moving the same as the air pressure changes, and means coupled to said coil forming an oscillator for producing a code signal the frequency of which is controlled by movement of said core portion to provide a signal having a frequency related to the air pressure, transmitting means, control means for applying said code signal to said transmitting means and for causing intermittent operation of said transmitter to periodically transmit an interrogation pulse including said code signal, receiver means for receiving signals frequency modulated by a code signal related to the altitude of other aircraft, decoder means for producing a warning signal in response to a received code signal having a frequency within a predetermined range including the frequency of the code signal produced by said coder means, means coupled between said decoder and said transmitting means to cause transmission of reply signals between periods of coded frequency modulated transmission in response to said warning signal, and alarm means coupled to said decoder means and responsive to said warning signal to produce an alarm in the one aircraft.

9. Apparatus for use in one aircraft for warning of the proximity of other aircraft in the same altitude region including in combination, coder means for producing a code signal having a frequency related to the altitude of the one aircraft, transmitting means, control means coupled to said coder means and to said transmitting means to cause operation of said transmitting means to transmit an interrogation wave including said code signal, receiver means including a plurality of spaced antennas and receiving sections individually connected thereto, one of said receiving sections including means for deriving the received code signals, decoder means coupled to said one receiving section for producing a warning signal in response to a received code signal having a frequency indicating another aircraft in the altitude region of said one aircraft, alarm means in the aircraft coupled to said decoder means and responsive to said warning signal, means coupling said decoder means to said transmitting means to cause operation of said transmitting means to transmit a reply wave in response to said warning signal, direction and range determining means coupled to said receiver sections and responsive to a reply wave from another aircraft which is transmitted after receipt of a modulated wave from the one aircraft, and display means coupled to said direction and range determining means, said display means including a panel having a plurality of transparent sections which are selectively illuminated to indicate the region occupied by an aircraft transmitting a reply wave.

10. Apparatus for use in one aircraft for warning of the proximity of other aircraft in the same altitude region including in combination, a transmitter for transmitting a carrier wave, coder means for producing a code signal having a frequency related to the altitude of the aircraft, control means for applying said code signal to said transmitter and for causing operation of said transmitter to transmit an interrogation pulse frequency modulated by said code signal, receiver means including first, second and third antennas, said first and second antennas being spaced transversely across the aircraft, said third antenna being spaced longitudinally of the aircraft with respect to said first and second antennas, first, second and third receiving sections connected to said first, second and third antennas respectively, one of said receiving sections including means for deriving frequency modulation from received waves, decoder means coupled to said one receiving section for producing a warning signal in response to a received code signal having a frequency indicating another aircraft in the same altitude region as the one aircraft, alarm means in the aircraft coupled to said decoder means and responsive to said warning signal, means coupling said decoder means to said transmitter to cause operation of said transmitter to transmit a reply pulse at the termination of a received interrogation pulse, display means including a panel having a plurality of transparent sections positioned to represent regions of varying angle and range with respect to the position of the one aircraft, a plurality of lamps individually associated with said transparent section for illuminating the same, and means coupled to said control means and to said first, second and third receiving sections for selectively illuminating said lamps in response to reply waves received from other aircraft.

11. Apparatus for use in each of several aircraft to exchange warning signals for the avoidance of collisions, the combination in one such aircraft including, transmitting means, coder means for producing a code signal having a frequency related to the altitude of said one aircraft, means for modulating the carrier wave of said transmitting means by said code signal, control means for causing intermittent operation of said transmitting means to transmit carrier wave pulses of a predetermined length and at a predetermined repetition rate, said pulses frequency modulated by said code signal, a plurality of spaced antennas, receiving means, said receiving means having receiving sections phase locked by a common local oscillator and individually connected to said antennas, decoder means coupled to one of said receiving sections for deriving frequency modulation from received waves to produce a warning signal in response to a received code signal having a frequency indicating other aircraft in the altitude region of said one aircraft, alarm means coupled to said decoder means and responsive to said warning signal, means coupling said decoder means to said transmitting means to cause transmission of a pulsed reply signal wave between periods of intermittent frequency modulated operation of said transmitting means, and direction and range finding means coupled to said receiver sections responsive to pulsed reply signal waves from other aircraft, which waves being transmitted after receipt and decoding of a modulated wave from said one aircraft.

References Cited in the file of this patent
UNITED STATES PATENTS

| | | |
|---|---|---|
| 2,157,122 | Dunmore | May 9, 1939 |
| 2,441,464 | Albright | May 11, 1948 |
| 2,574,647 | Lorenzen | Nov. 13, 1951 |
| 2,980,908 | Vielle | Apr. 18, 1961 |

OTHER REFERENCES

"Heart of Anti-Collision System," by Holahan, Aviation Age, vol. 26, No. 6, December, 1956, pp. 80–83.